United States Patent
Acharya et al.

(10) Patent No.: US 6,519,604 B1
(45) Date of Patent: Feb. 11, 2003

(54) APPROXIMATE QUERYING METHOD FOR DATABASES WITH MULTIPLE GROUPING ATTRIBUTES

(75) Inventors: Swarup Acharya, New Providence, NJ (US); Phillip B. Gibbons, North Plainfield, NJ (US); Viswanath Poosala, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 259 days.

(21) Appl. No.: 09/619,902

(22) Filed: Jul. 19, 2000

(51) Int. Cl.⁷ .............................................. G06F 17/30
(52) U.S. Cl. ........................ 707/102; 707/3; 707/104; 707/100
(58) Field of Search ................ 707/102, 5, 3, 707/2, 1, 100, 101, 200, 104

(56) References Cited

U.S. PATENT DOCUMENTS

| | | | | |
|---|---|---|---|---|
| 5,335,345 A | * | 8/1994 | Frieder et al. ................ | 707/5 |
| 5,878,426 A | | 3/1999 | Plasek et al. ................ | 707/102 |
| 5,890,150 A | * | 3/1999 | Ushijima et al. ............... | 707/3 |
| 5,893,090 A | * | 4/1999 | Friedman et al. ............... | 707/3 |
| 5,987,467 A | * | 11/1999 | Ross et al. .................... | 707/100 |
| 5,999,928 A | * | 12/1999 | Yan ............................. | 707/100 |
| 6,012,064 A | * | 1/2000 | Gibbons et al. ............. | 707/101 |
| 6,282,570 B1 | * | 8/2001 | Leung et al. ................ | 707/200 |

* cited by examiner

*Primary Examiner*—Sanjiv Shah
(74) *Attorney, Agent, or Firm*—Synnestvedt & Lechner LLP (57) ABSTRACT

An approximate querying method comprising grouping tuples within a database according to grouping attributes, determining how many tuples are needed to represent each group, selecting the tuples from a corresponding group to create a database sample, and querying the database sample. The database sample yields statistically unbiased answers when queried. The sample may be created and maintained without a priori knowledge of the data distribution within the database or the queries to be performed.

38 Claims, 7 Drawing Sheets

FIG. 1

| A | B | HOUSE $S_{g,0}$ | SENATE $S_{g,AB}$ | BASIC CONGRESS (BEFORE SCALING) | BASIC CONGRESS | $S_{g,A}$ | $S_{g,B}$ | CONGRESS (BEFORE SCALING) | CONGRESS |
|---|---|---|---|---|---|---|---|---|---|
| $a_1$ | $b_1$ | 30 | 25 | 30 | 27.3 | 20 (OF 50) | 33.3 | 33.3 | 23.5 |
| $a_1$ | $b_2$ | 30 | 25 | 30 | 27.3 | 20 (OF 50) | 33.3 | 33.3 | 23.5 |
| $a_1$ | $b_3$ | 15 | 25 | 25 | 22.7 | 10 (OF 50) | 12.5 (OF 33.3) | 25 | 17.7 |
| $a_2$ | $b_3$ | 25 | 25 | 25 | 22.7 | 50 | 20.8 (OF 33.3) | 50 | 35.3 |

| l_returnflag | l_linestatus | sum(l_quality) |
|---|---|---|
| A | F | 3773034 |
| N | F | 100245 |
| N | O | 7459912 |
| R | F | 3779140 |

FIG. 5

| l_returnflag | l_linestatus | sum(l_quality) | error1 |
|---|---|---|---|
| A | F | 3.778e+06 | 1.4e+04 |
| N | F | 1.194e+05 | 2.6e+04 |
| N | O | 7.457e+06 | 1.9e+04 |
| R | F | 3.782e+06 | 1.4e+04 |

FIG. 6

| Key | Grouping Columns | | | Aggregate Column |
|---|---|---|---|---|
| K | A | B | C | Q |
| $k_1$ | $a_1$ | $b_1$ | $c_1$ | $q_1$ |
| $k_2$ | $a_1$ | $b_1$ | $c_2$ | $q_2$ |

FIG. 7

```
select A, B, sum(Q)
from Rel
group by A, B;
```

APPROXIMATE QUERYING METHOD FOR DATABASES WITH MULTIPLE GROUPING ATTRIBUTES

FIELD OF THE INVENTION

The present invention relates generally to querying electronic data and, more particularly, to an approximate querying method for querying databases.

BACKGROUND OF THE INVENTION

Approximate query processing is a term used to identify the techniques and methods for providing estimated answers to database queries. Such a database querying system is used to improve the query response performance by reducing the time required for the system to respond to queries.

Approximate querying systems provide fast responses by running queries on some form of summary statistics of the database, such as samples or histograms. Additionally, the approximate answers are often supplemented with a statistical error bound to indicate the quality of the approximation to the user (i.e., the end-user analyzing the data in the warehouse.) Since the statistics are typically much smaller in size, the query is processed very quickly. The statistics are generated on-the-fly after the query is posed, or may be precomputed a priori, as in the Approximate QUery Answering (AQUA) system disclosed in U.S. patent application Ser. No. 09/480,261, entitled Join Synopsis-Based Approximate Query Answering to Acharya et al., and U.S. patent application Ser. No. 09/081,660, entitled System and Techniques for Fast Approximate Query answering to Acharya et al., both of which are herein incorporated by reference.

A common sampling technique for summarizing data involves taking uniform random samples of the original data. Uniform random samples, in which every item in the original data set has the same probability of being sampled, are used because they mirror the original data distribution. Due to the usefulness of uniform samples, commercial database management systems (DBMSs), such as Oracle 8i, are already supporting operators to collect uniform random samples.

While uniform random samples provide highly-accurate answers for many classes of queries, there are important classes of queries for which they are less effective. These include queries where data is segmented into groups and aggregate information is derived for these groups. This is typically done in SQL using the group by operation, referred to herein as "group-by queries." For example, a group-by query on the U.S. census database containing information about every individual in the nation could be used to determine the per capita income per state. Often, there can be a huge discrepancy in the sizes of different groups, e.g., California has nearly 70 times the population of Wyoming. As a result, a uniform random sample of the relation will contain many fewer tuples (i.e., rows of information in a database) from the smaller groups (states), which leads to poor accuracy for answers on those groups because accuracy is highly dependent on the number of sample tuples that belong to that group. This behavior often renders the answer essentially useless to the analyst, who is interested in reliable answers for all groups. For example, a marketing analyst using the Census database to identify all states with per capita incomes above some value will not find the answer useful if the aggregates for some of the states are highly erroneous.

One approach to the accuracy problem is online aggregation, described by J. M. Hellerstein et al., "Online Aggregation," Proc. ACM SIGMOD International Conf. on Management of Data, pp. 171–182, May 1997. The Online Aggregation approach employs an index striding technique to sample smaller groups at a higher rate. This approach requires significant modifications to the program code of the DBMS and slows down the query response time.

Another approach to the accuracy problem is statistical database querying, described in U.S. Pat. No. 5,878,426 to Plasek et al., entitled Statistical Database Query Using Random Sampling of Records. In this approach, individual samples are selected from each group, where the sample size of each group varies in order to achieve a desired accuracy for each group. The resulting samples are targeted for a specific partitioning into groups and a specific database attribute, and the samples for other partitions or attributes will typically lead to inaccurate answers. Moreover, a completely new sample is needed whenever new records are inserted to the database.

The inability of uniform random samples to provide accurate group-by results is a symptom of a more general problem with uniform random samples: they are most appropriate when the utility of the data mirrors the data distribution. Thus, when the utility of a subset of the data is significantly higher relative to its size, the accuracy of the answer may not meet the user's expectation. The group-by query is one such case where a smaller group is often as important to the user as the larger groups, even though it is under-represented in the data. A multi-table query is another example: a small subset of the data in a table may dominate the query result if it joins with many tuples in other tables. The flip side of this scenario is where different logical parts of the data have equal representation, but their utility to the user is skewed. This occurs, for example, in most data warehouses where the usefulness of data degrades with time. For example, consider a business warehouse application analyzing the transactional data in the warehouse to evaluate a market for a new line of products. In this case, data from the previous year is far more important than outdated data from a decade ago. Moreover, the user is likely to ask more finer-grained queries over the more recent data. This, in turn, means that it is advantageous for the approximate answering system to collect more samples from the recent data, which is not achieved with a uniform random sample over the entire warehouse.

Accordingly, approximate querying methods which address the above limitations are desirable.

SUMMARY OF THE INVENTION

The present invention relates to providing fast, highly-accurate approximate answers for a broad range of queries, including group-by queries. In the present invention, non-uniform (i.e., biased) samples of the data to be queried are pre-computed. In particular, a database sample of uniform and biased samples is created. The database sample is then queried using approximate querying techniques. Given a fixed amount of space, the database sample maximizes an objective function for the accuracy of all possible queries. In addition, by pre-computing the database sample, tremendous advantages in speed are achieved over non-sampling methods and methods which generate samples after the query is formulated.

The database sample is created by grouping tuples within a database according to grouping attributes, determining how many tuples are needed to represent each group, and selecting the tuples from a corresponding group to create the database sample. The database sample is then queried to obtain a statistically unbiased answer. The database sample may be created and maintained without a priori knowledge of the data distribution within the database or the queries to be performed.

The present invention takes group-sizes into consideration to generate the database sample. By considering group-sizes, a compact database sample can be created which yields fast and highly-accurate answers to queries containing group-by operations on underlying data with varying group-sizes.

A single pass algorithm for constructing the database sample is disclosed. In addition, an algorithm is disclosed for incrementally maintaining the sample with up-to-date information without accessing the base relation.

DETAILED DESCRIPTION OF THE INVENTION

The present invention relates to determining approximate answers to queries of a database. In the present invention, a database sample is created. The database sample is then queried. The database sample is generated such that it yields statistically unbiased answers when queried. The database sample is created by grouping tuples within a database according to grouping attributes, determining how many tuples are needed to represent each group, and selecting the tuples from a corresponding group to create a database sample; and querying the database sample. The database sample may be created and maintained without a priori knowledge of the data distribution within the database or the queries to be performed. For ease of description, group-by queries are emphasized. Group-by queries are emphasized because they are among the most important class of queries in on-line analytical processing (OLAP), forming an essential part of the common drill-down and roll-up processes. However, the present invention can be applied wherever the limitations of uniform random samples become critical.

I. Generating Samples (Congressional Samples)

There are a number of factors affecting the quality of an answer computed from a sample, including the query, the data distribution, and the sample size. Of these, sample size is the most universal in improving answer quality across a wide range of queries and data distributions. Thus, it is very important to ensure that all groups are well-represented in the sample. Single table queries are illustrated; however, the present invention can be extended to queries with foreign key joins, which are the most common type of joins, e.g., all joins in the TPC BENCHMARK™ D (TPC-D) are on foreign keys.

The present invention is tailored to pre-computed or materialized samples, such as used in the Approximate Query Answering (AQUA) system. The advantages of pre-computing over sampling at query time include: (1) obtaining answers quickly without accessing the original data at query time, (2) efficiently storing sampled tuples in a few memory locations, avoiding the overhead associated with random scanning, (3) limiting or negating the need to change a DBMS's query processor and/or optimizer, and (4) easily incorporating data outliers, such as small groups, into the sample.

In the present invention, a union of biased and uniform samples called a congressional sample is created which yields statistically unbiased answers to queries with arbitrary group-by (including no group-bys), with significantly higher accuracy guarantees than uniform samples. Given a fixed amount of space, a congressional sample maximizes the accuracy for all possible group-by queries over a set of columns. The congressional samples can be tailored to specific subsets of group-by queries and extended to use detailed information about the data, such as a variance, and to improve the answers for non-group-by queries.

In a preferred embodiment of the present invention, a one pass algorithm for constructing a congressional sample without a priori knowledge of the data distribution is used. In addition a similar algorithm is used to incrementally maintain the congressional sample as new data is inserted into the database, without accessing the base relation. This ensures that queries continue to be answered well even as the database changes significantly.

The central tables in a data warehouse contain several attributes that are commonly used for grouping the tuples (i.e., rows of information in a database) in order to aggregate some measured quantities over each group. These are called the dimensional or grouping attributes. The attributes used for aggregation are called measured or aggregate attributes.

For example, consider the central table (census) in a Census database containing the following attributes for each individual (attribute names are listed in brackets): social security number (ssn), state of residence (st), gender (gen), and annual income (sal). In this schema, the grouping columns are st and gen, whereas the aggregate column is sal. A typical group-by query on census may request the average income of males and females in each state.

It can be seen that for a relation containing a set G of grouping attributes, there are exactly $2^{|G|}$ possible groupings (the power set U of G) that can occur in a query. In the census relation, G is {st, gen} and U is {$\notin$, (st), (gen), (st, gen)} ($\notin$ is the empty set).

At a high-level, a user has two requirements on the approximate answer to a group-by query. First, the approximate answer should contain all the groups that occur in the exact answer, and second, the estimated answer for every group should be close to the exact answer for that group. The first requirement is satisfied, as long as the query predicates are not too selective, by ensuring that the schemes presented provide at least minimum-sized samples for every nonempty group in the relation across all grouping attributes. (The only way to ensure this requirement for highly selective queries is to sample nearly the entire relation. Otherwise, none of the sampled tuples may satisfy the predicate.) Hence, the second requirement is addressed assuming the first to be true.

In general, it is not possible to tailor a strategy for a pre-computed sample that works best for all scenarios. One solution is to sample from each state in proportion to the state's population, whereas another would be to sample an equal number from each state. Considering the two branches of the U.S. Congress, the former is analogous to the House of Representatives (House) while the latter is analogous to the Senate. The present invention is a hybrid extension and combination of these concepts. Strategy S1 is useful for creating pre-computed query samples for use in the present invention.

S1: Divide the target sample space X equally among the g groups, and take a uniform random sample within each group.

House: Apply the strategy S1 to the class of aggregate queries without group-bys. In this case, according to S1, a uniform random sample of size X of the entire relation is done for the single group.

Senate: Apply the strategy S1 to the class of aggregate queries with a set T of grouping attributes. For a given relation R, these attributes define a set, G', of nonempty groups. Let $m_T$ be the number of groups in G'. By following S1, for each nonempty group g in G', a uniform random sample of size $X/m_T$ is taken from the set of tuples in R in group g. For example, if T=state in a US census database, then G' is the set of all states, $m_T$=50, and a uniform random sample of size X/50 is taken from each state. (For simplicity it is assumed that each group is larger than the number of samples drawn from it. However, handling situations where a group is smaller than the number of samples to be drawn from it would be apparent to one skilled in the art.)

Given a Senate sample for group-by queries involving an attribute set T, approximate answers to group-by queries on any subset T' of T are provided with at least the same quality. This is because any group on T contains one or more groups on T. Hence it will have at least as many sample points as any group in T, and correspondingly the same or better performance.

House and Senate Limitations: Note that using the samples from House would result in very few sample points for small groups. On the other hand, Senate allocates fewer tuples to the large groups in T than House. Hence, whenever queries are uniformly spread over the entire data, more of them occur in the large groups, and House will perform better than Senate for those cases.

Basic Congress

According to one embodiment of the present invention, the strategy S1 is applied to the class of aggregate queries containing group-by queries grouping on a single set T of attributes and queries with no group-bys at all. One method is to collect both the House and the Senate samples (analogous to the U.S. Congress). This doubles the sample space, therefore, the samples are reduced by a factor of 2 using the following strategy.

Let G be all the non-empty groups in the grouping on T, and let $m_T=|G|$. Let g be a group in G and X be the available sample space. Let $n_g$ be the number of tuples in the relation R in group g. Let $h_g$ and $s_g$ be the (expected) sample sizes allocated to g under House and Senate, respectively. Then, under the new approach, the higher of these two (i.e., $\max(h_g, s_g)$ are allocated to g. Of course, this may still result in a total space of X' that is larger than X (it can be shown that $X' \leq ((2m_T-1)/m_T)X-m_T+1<2X$.) Hence, the sample sizes are uniformly scaled such that the total space equals X. The final sample size allocated to group g is given by:

$$SampleSize(g) = X \frac{\max\left(\frac{n_g}{|R|}, \frac{1}{m_T}\right)}{\sum_{j \in G} \max\left(\frac{n_j}{|R|}, \frac{1}{m_T}\right)} \quad (1)$$

A Basic Congress sample is constructed by selecting a uniform random sample of size SampleSize(g) for each group g in G'.

In an alternate embodiment, let $Y=X/[\Sigma_{j \in G} \max (n_j/|R|, 1/m_T)]$. A uniform sample of size Y is taken from the relation R. Let $x_g$ be the number of sampled tuples from a group g. For each group g such that $x_g<Y/m_T$, where $m_T$ the number of nonempty groups, add to the sample $Y/m_T-x_g$ additional tuples selected uniformly at random from the set of tuples in R in group g. Due to the choice of Y, the expected size of the resulting sample is X. In practice, the difference between the two embodiments is negligible.

As an example, consider a relation R with two grouping attributes A, B. The different values in these attributes are depicted in the first two columns of FIG. 1. Assume that the number of tuples for the groups $(a_1,b_1)$, $(a_1,b_2)$, $(a_1,b_3)$, $(a_2,b_3)$ are 3000, 3000, 1500, and 2500 respectively. The next two columns depict the space allocated by House and Senate with T={A,B} and X=100. The fifth column depicts the space allocated by Basic Congress (before scaling down) by choosing the maximum of the House and Senate allocations for each group. The next column shows the allocation scaled down to fit the total available space. Note that while House allocates less space for the small group and Senate allocates less space for the large groups, Basic Congress solves both these problems. On the other hand, Basic Congress produces insufficient sample sizes for groupings on subsets of T. For example, it would be desirable for queries that group on A alone to allocate samples of size 50 and 50 to the two groups $a_1$ and $a_2$, whereas Basic Congress applied to T allocates samples of size 77.3 and 22.7, respectively. Consequently, using Basic Congress to answer an aggregate query grouped solely on A would likely lead to a less accurate estimate on the group $a_2$.

Congress

In a preferred embodiment of the present invention, the entire set of possible group-by queries over a relation R is considered, i.e., queries grouping the data on any subset (including $\emptyset$) of the grouping attributes, G, in R. Applying Strategy S1 using a target space X on each such grouping would result in a space requirement of $2^{|G|}X$. Hence, an optimization similar to Basic Congress is performed, however, this time over all possible groupings—not just G and $\emptyset$, as in Basic Congress.

Let G' be the set of non-empty groups under the grouping G. The grouping G partitions the relation R according to the cross-product of all the grouping attributes; this is the finest possible partitioning for group-bys on R. Any group h on any other grouping T that is a subset of G is the union of one or more groups g from G'. Each such g is denoted as a subgroup of h. For example, in FIG. 5, G={A, B}, G'={($a_1$, $b_1$), ($a_1$,$b_2$), ($a_1$,$b_3$), ($a_2$,$b_3$)}, and for the grouping T={A}, the set of tuples in the group h=$a_1$ is the union of the tuples in the subgroups ($a_1$,$b_1$), ($a_1$,$b_2$), and ($a_1$,$b_3$) of h.

To construct Congress according to the preferred embodiment, apply S1 on each $T \subseteq G$. Let T' be the set of non-empty groups under the grouping T, and let $m_T=|T'|$ the number of such groups. Using strategy S1, each of the non-empty groups in T should get a uniform random sample of $X/m_T$ tuples from the group. Thus, for each subgroup g in G' of a group h in T', the expected space allocated to g (from considering T) is simply $$s_{g,T} = \frac{X}{m_T} \cdot \frac{n_g}{n_h} \quad (2)$$

where $n_g$ and $n_h$ are the number of tuples in g and h, respectively. Then, for each group g∈G', take the maximum over all T of $S_{g,T}$ as the sample size for g, and scale it down to limit the space to X. The final formula is:

$$SampleSize(g) = X \frac{\max_{T \subseteq G} s_{g,T}}{\sum_{j \in G'} \max_{T \subseteq G} s_{j,T}} \quad (3)$$

For each group g in G', select a uniform random sample of size SampleSize(g). Thus, a stratified, biased sample is taken in which each group at the finest partitioning is its own strata.

Figure 1:
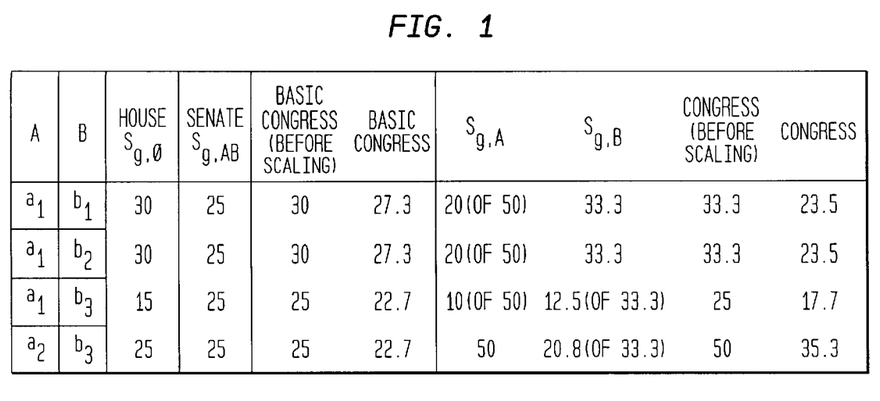
FIG. 1 is a table of calculated sample sizes in accordance with the present invention.

The space allocation by Congress for G={A,B} is depicted in the last two columns of FIG. 1 before and after scaling. Each entry in the "before scaling" column is the maximum of the corresponding entries in the $s_{g,\emptyset}$, $s_{g,A}$, $s_{g,B}$, and $s_{g,AB}$ columns. These $s_{g,T}$ contain the target allocations according to S1 when considering grouping solely on T. By taking the row-wise maximum and then scaling down all values by the same amount $$f = \frac{X}{\sum_{j \in G'} \max_{T \subseteq G} s_{j,T}}, \quad (4)$$

it is ensured that the sample size for every group across all combinations of group-by columns is within a factor of at most f of its target allocation. Thus, Congress essentially guarantees that both large and small groups in all groupings will have a reasonable number of samples.

It will be apparent to one skilled in the art that functions other than the maximum function (max) can be used in Equation (3), e.g., the average function.

Alternative definitions of Congress: In the preferred embodiment of Congress above, a target sample size was determined for each group (Equation 3) and then a uniform sample of exactly that many tuples was collected from the group. An alternative embodiment of this definition is to instead select each tuple in a group g with probability SampleSize(g)/$n_g$. Thus the expected number of tuples from g in the sample remains SampleSize(g), but the actual number may vary due to random fluctuations. In a related embodiment SampleSize(g) is not explicitly computed, instead selection is based on the probability for each tuple to be selected for the sample based on all the groups in which it appears:

$$\text{Pr(tuple } \tau \text{ selected for the sample)} = \frac{\max_{T \subseteq G} \frac{X}{m_T n_{g(\tau,T)}}}{\sum_{t \in R} \max_{T \subseteq G} \frac{X}{m_T n_{g(t,T)}}} \quad (5)$$

where g($\tau$, T) is the group under grouping T to which $\tau$ belongs. As with the previous definition the expected number of tuples from a group g is SampleSize(g). Another alternative embodiment is depicted in the following pseudo-code:

compute f using Equation 4
    for i=0, 1, . . . , |G|
        for each $T \subseteq G$ with |T|=i
            for each nonempty group g under grouping T
                let $s_g$ be the number of sampled tuples selected
                    for g in any previous sampling for a grouping
                    $T' \subset T$
                if ($s_g < f^*X/m_T$) then select $f^*X/m_T - s_g$ additional
                    tuples uniformly at random from group g This approach explicitly exploits the fact that a uniform random sample for a group g under grouping T can use the sampled tuples from g in any previously selected uniform random sample for a grouping $T' \subset T$. In practice, the difference between these embodiments is negligible.

The above strategies can be extended to handle preferences between groupings and/or between groups, whenever they can be determined. For all $T \subseteq G$ and all groups h in T, let $r_h$ be the relative preference of group h for its sample size. Then for each group g in G, a uniform random sample is of size $$SampleSize(g) = \max_{h \text{ in } T \subseteq G: \ g \text{ is a subgroup of } h} \frac{X r_h n_g}{n_h} \quad (6)$$

is selected, appropriately scaled down so that the total space is X.

Computation and Maintenance

In a preferred embodiment, an algorithm is used for constructing the various biased samples (i.e., samples for the groups g of size SampleSize(g)) and for maintaining them in the presence of insertions of new tuples into the relation. In the preferred embodiment, the samples are constructed in one pass through the relation and the samples are maintained without accessing the stored relation.

Constructing using a data cube: Biased samples of a target size for each group can be constructed for all groups in one pass through the relation using reservoir samplings for each group. Reservoir sampling techniques are well known in the art, e.g., see ACM Transactions on Mathematical Software, 11(1):37–57, 1985, herein incorporated by reference. Given a data cube of the counts of each group in all possible groupings, the target sizes are computed (e.g., using Equations (1), (3)), and then any of the biased samples can be constructed in one pass. However, in the absence of a data cube, the biased samples can still be constructed in one pass, by applying algorithms described below for incrementally maintaining the samples.

Constructing and maintaining House and Senate: House and Senate samples can be incrementally maintained, and hence constructed in one pass, as follows. Let X be the target sample size. If m is the current number of nonempty groups, a uniform random sample of size X/m is maintained for each group using reservoir sampling. Reservoir sampling is cost efficient and is based on predetermining how many insertions to skip over before the next is added to the sample; a counter counts down as new tuples are inserted. When a tuple is selected for the sample, a random tuple currently in the sample is evicted. In the present case, the counter is decremented and tested on a per-group basis. If a tuple for a group that has not been seen before is encountered, a new sample is begun (for that group), and the target sample size is decreased to X/(m+1). Random tuples are evicted from each existing group, as more tuples for this or other new groups are inserted into the relation, in order to maintain a total sample size of X.

Constructing and Maintaining Basic Congress

Basic Congress samples are incrementally maintained, and, in a preferred embodiment, constructed in one pass, without using a data cube. The difficulty arises from taking the maximum between the House and the Senate requirements. The idea is to maintain a single, uniform, random sample of the entire relation and store the extra tuples in each group as spill-over "delta" uniform samples per group. The algorithm is as follows. Let m be the current number of nonempty groups, and assume Y (the sample size allocated by Basic Congress using either House or Senate before scaling down) is fixed. A reservoir sample of size Y of the entire relation is maintained, and a count, $x_g$, of the number of tuples from group g in the reservoir sample is stored. In addition, m delta samples—uniform random samples, $\Delta_g$, of size max(0, (Y/m)−$x_g$) from each group g—are also maintained. The following outline shows how to maintain these samples when a new tuple, $\tau$, is inserted into the relation.

1. If $\tau$ is not selected for the reservoir sample, do nothing. This is the common case.
2. If $\tau$ is selected for the reservoir sample and the tuple, $\tau'$, is evicted from the reservoir sample, then if both $\tau$ and $\tau'$ are in the same group, do nothing.
3. Otherwise, let $\tau$ belong to an existing group g and $\tau'$ belong to group g'. Increment $x_g$ and evict at random a tuple from $\Delta_g$ if it is not empty. Decrement $x_{g'}$ and if now $x_{g'}$<Y/m then add $\tau'$ to $\Delta_{g'}$. This maintains the invariant on both $\Delta_g$ and $\Delta_{g'}$.
4. If the addition of new groups is to be handled, then a counter $n_g$ of the number of tuples in the group in the relation should be maintained for each group g whose count is less than Y/m. Whenever a tuple $\tau$ belonging to group g is inserted such that $n_g$<Y/m and $\tau$ is not selected for the reservoir sample, add $\tau$ to $\Delta_g$. If g is a new group, increase m to m+1, and lazily evict random tuples from nonempty delta samples such that $|\Delta_h|$+$x_h$≦Y/(m+1) for group h. Such lazy evictions occur only when tuples are added to delta samples.

Theorem: The above maintenance algorithm maintains a valid basic congressional sample. Proof: The only subtlety is to show that each delta sample $\Delta_g$ is a uniform random sample of its group g despite steps 3 and 4. The tuples in the reservoir sample belonging to group g' are a uniform random sample of g', since each tuple is equally likely to be selected for the reservoir sample, and each tuple in the reservoir is equally likely to be evicted. Among the tuples, $S_{g'}$, in the reservoir belonging to g', each tuple is equally likely to be evicted. Thus each tuple added to $\Delta_{g'}$ can be seen as selected uniformly at random from g'. The direct addition to $\Delta_g$ in step 4 occurs if and only if $|\Delta_g|$+$x_g$=$n_g$, i.e., all tuples in g are either in the reservoir sample or in $\Delta_g$. Since the ones in the reservoir were selected uniformly at random from among the tuples in g, $\Delta_g$ is a uniform random sample of g. Note that although the uniform random sample property is not preserved under random insertion without eviction, it is preserved under random eviction without insertion, therefore, eviction can occur at any time.

Note that the algorithm maintains a valid basic congressional sample whose size is determined by the choice of Y, and, in fact, can fluctuate depending on changes in the data distribution. The difficulty in maintaining a basic congressional sample of a fixed target size X without accessing the stored relation is that the scale down factor can decrease due to changes in the data distribution, requiring additional sampled tuples from certain groups. Obtaining these additional tuples requires accessing the stored relation. The cost of sampling is amortized from the stored relation by tolerating a sample size that is within some threshold of X, so that sampling from the stored relation can occur less frequently. Note that if the relative distribution among the groups remains roughly the same, then the scale down factor remains roughly the same, and there is no need to access the stored relation.

Constructing and Maintaining Congress

Congress samples can be incrementally maintained, similar to Basic Congress, for a fixed Y without accessing the stored relation or a data cube; the algorithm is a natural generalization to multiple groupings of the above algorithm for maintaining Basic Congress. Alternatively, a congressional sample constructed according to Equation 5 can be maintained for a fixed Y as follows. The invariant to be maintained is that each tuple $\tau$ is selected for the sample with probability $\max_{T \subset G}(Y/(m_{T^*}n_{g(\tau, T)}))$. By keeping track of all the $m_T$ and $n_g$, it can be ensured that any tuple being inserted into the relation is selected for the sample with this probability. The potential difficulty is that the invariant must be maintained even for tuples previously stored in the relation, despite ongoing updates to $m_T$ and $n_g$, without accessing the stored relation. However, because both $m_T$ and $n_g$ can only increase with newly inserted tuples, the probability of selection only decreases. Thus any (stored) tuple that was not selected for the sample under the more relaxed selection probability would not have been selected based on the same probabilistic event with a stricter selection probability. Each time the probability of selection for tuples in a group decreases from p to q, each tuple in the sample from that group with a probability q/p can be evicted, while maintaining the desired invariant. (e.g., P. B. Gibbons and Y. Matias, New Sampling-based Summary Statistics for Improving Approximate Query Answers, Proc. ACM SIGMOD International Conf On Management of Data, pages 331–342, June 1998, incorporated herein by reference.) Note that the per-insert bookkeeping overheads of this algorithm grow in proportion to $2^{|G|}$, because each tuple $\tau$ is in $2^{|G|}$ groups, and the counter for each of these groups is incremented.

Either approach can also be used to construct a congressional sample in one pass, without using a data cube, by running the algorithm with Y=X, computing the scale down factor, and then subsampling the sample to achieve the desired size X.

II. Querying

In the present invention, the congressional samples are queried. For ease of description, the querying aspect of the present invention will focus on AQUA. However, it will be readily apparent to those in the art that other types of query methods can be adapted or developed for use over the congressional samples.

AQUA maintains smaller-sized statistical summaries of the data, called synopses, and uses them to answer queries. A key feature of AQUA is that the system provides probabilistic error/confidence bounds on the answer. Currently, the system handles arbitrarily complex SQL queries applying aggregate operations (avg, sum, count, etc.) over the data in the warehouse.

Figure 2:
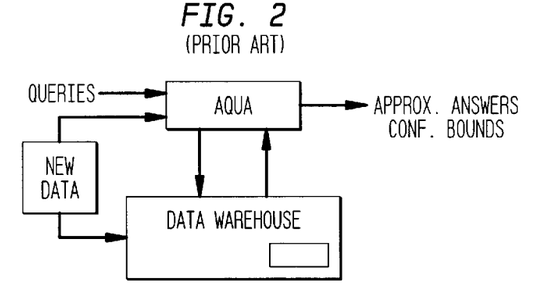
FIG. 2 is a block diagram of a prior art Approximate QUery Answering (AQUA) system.
Figure 3:
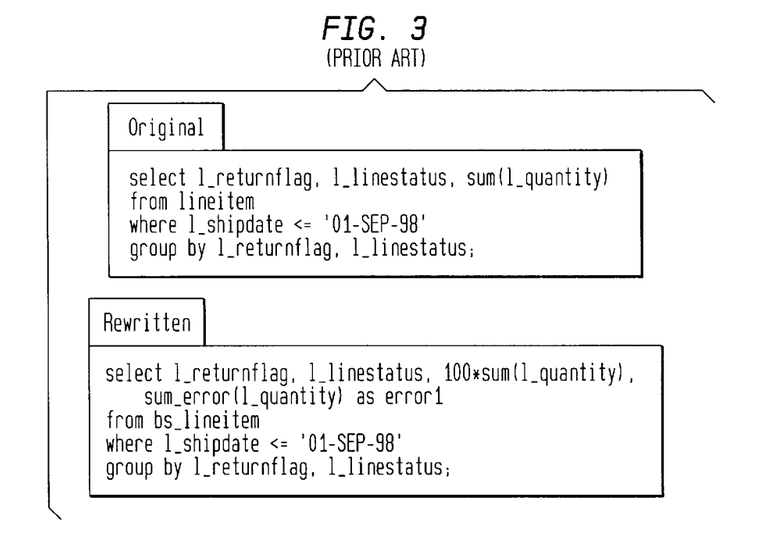
FIG. 3 is a prior art sample query rewritten for use by the AQUA system of FIG. 2.
Figure 4:
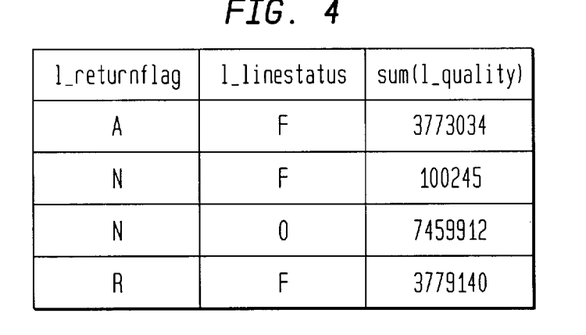
FIG. 4 is a table depicting exact answers to a query.
Figure 5:
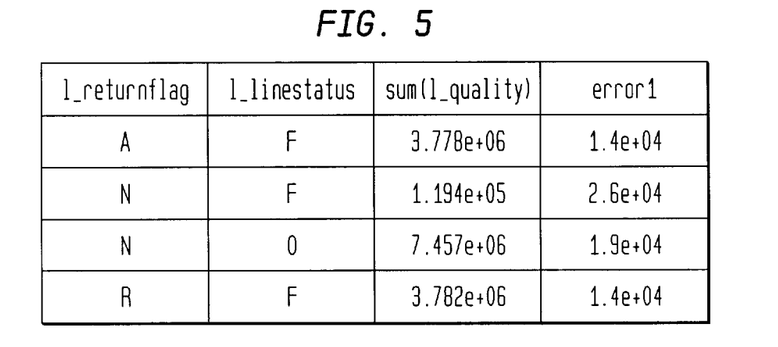
FIG. 5 is a table depicting approximate answers with error bounds to a query.

The high-level architecture of the AQUA system is shown in FIG. 2. It is designed as a middleware software tool that can sit atop any commercial DBMS managing a data warehouse that supports ODBC connectivity. Initially, AQUA takes as an input from the warehouse administrator the space available for synopses and, if available, hints on important query and data characteristics. This information is then used to pre-compute a suitable set of synopses on the data, which are stored as regular relations in the DBMS. These synopses are also incrementally maintained up-to-date to reflect changes in the warehouse data. When the user poses an SQL query to the full database, AQUA rewrites the query to use the AQUA synopsis relations. The rewriting involves appropriately scaling expressions in the query, and adding further expressions to the select clause to compute the error bounds. An example of a simple query rewrite is shown in FIG. 3. The original query is a simplified version of Query 1 of the TPC-D benchmark. The synopsis relation bs_lineitem is a 1% uniform random sample of the lineitem relation and for simplicity, the error formula for the sum aggregate is encapsulated in the sum_error function. The rewritten query is executed by the DBMS, and the results are returned to the user. The exact answer is given in FIG. 4. FIG. 5 shows the approximate answer and error bound provided by AQUA when using this synopsis relation, and indicates that the given approximate answer is within error1 of the exact answer with 90% confidence (an AQUA parameter). The approximate answer for l_returnflag=N and I_linestatus=F is considerably worse than for the other combinations; this is the smallest group (a factor of 35 or more smaller than the others in the TPC-D database), and hence it contributes very few tuples to the sample bs_lineitem. This demonstrates a limitation of uniform random samples and motivates the need for improved techniques.

Rewriting: AQUA rewrites queries such that they appropriately query uniform random samples. However, since the present invention uses non-uniform samples, modifications to AQUA are necessary. First some background is given on generating approximate answers from biased samples. Then, different embodiments are presented for rewriting queries in the presence of biased samples.

Figure 6:
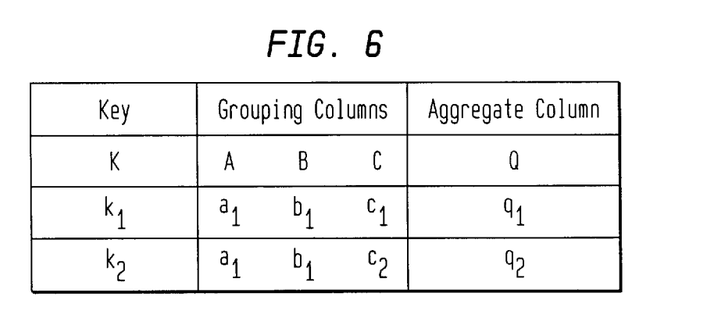
FIG. 6 is a table depicting the relation Rel containing two example tuples.

Approximate Answers from Biased Samples: Rewriting queries involves two steps: a) scaling up the aggregate expressions and b) deriving error bounds on the estimate. The desired formulas for both steps can be derived using standard techniques. In FIG. 3, the SUM operator was scaled by a factor of 100 since lineitem was a 1% uniform random sample. This factor is the ScaleFactor. However, biased samples are not uniform samples—instead they are a union of different sized uniform random samples of various groups in the relation. FIG. 6 shows a five column table on which the user poses the query $Q_2$, shown in FIG. 7. Let SampRel be a biased sample of relation Rel, and let the groups $<A=a_1,B=b_1,C=c_1>$ and $<A=a_1,B=b_1,C=c_2>$ be represented in SampRel by a 1% and 2% sample respectively. Since both groups contribute to the group $<A=a_1, B=b_1>$ in the answer for $Q_2$, a non-uniform sample is produced from which an approximate answer can be derived.

Figure 7:
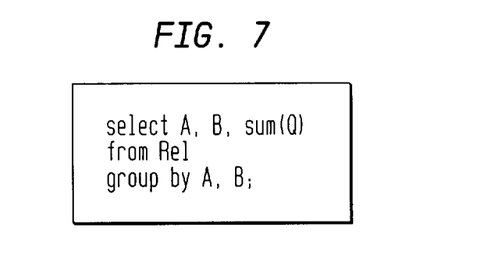
FIG. 7 is a two attribute group-by query for determining a sum of the data in FIG. 6.

Using known techniques for estimators based on stratified samples, an unbiased answer can be generated using all the tuples in the biased sample. For each tuple, let its scale factor ScaleFactor be the inverse of the sampling rate for its strata. For the SUM operator, scale each value being summed by its ScaleFactor, and then sum the result. In query $Q_2$, for example, scale $q_1$, by 100 and $q_2$ by 50, and then add up the scaled sum. For the COUNT operator, sum up the individual ScaleFactors of each tuple satisfying the query predicate. For the AVG operator, compute the scaled SUM divided by the scaled COUNT.

Note that this approach is superior to subsampling all groups down to a common sampling rate in order to apply techniques for uniform sampling. For example, if the sampling rate for a group is j orders of magnitude smaller than the sampling rate for other groups, then the relative error bound for a COUNT operator can be j/2 orders of magnitude worse.

Rewriting Strategies: Consider various strategies for rewriting queries to incorporate scaling using the example of the SUM operator. Rewriting queries for COUNT and AVG operators are similar; these operators are considered at the end of this section.

Note that all sample tuples belonging to a group under a grouping of all that group's attributes will have the same ScaleFactor. Thus, the key step in scaling is to be able to efficiently associate each tuple with its corresponding ScaleFactor. There are two approaches to doing this: a) store the ScaleFactor(SF) with each tuple in SampRel and b) use a separate table AuxRel to store the ScaleFactors for the groups. These two approaches give rise to three techniques described below.

Figure 8:
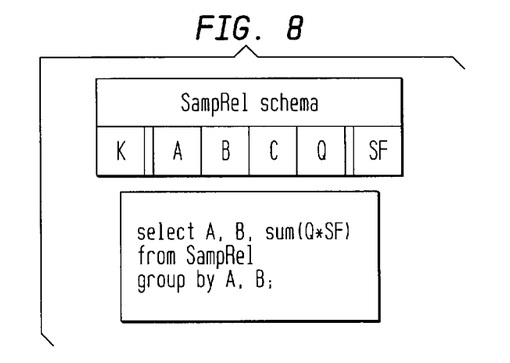
FIG. 8 is an integrated rewriting of the query in FIG. 7 in accordance with the present invention.

The first approach is highlighted in FIG. 8. The rewrite technique, called Integrated, incurs a space overhead of storing the ScaleFactor and a multiplication operation for every tuple. However, this approach incurs significant maintenance overhead—insertion or deletion of tuples from SampRel requires updating the ScaleFactor of all tuples in the affected groups.

Figure 9:
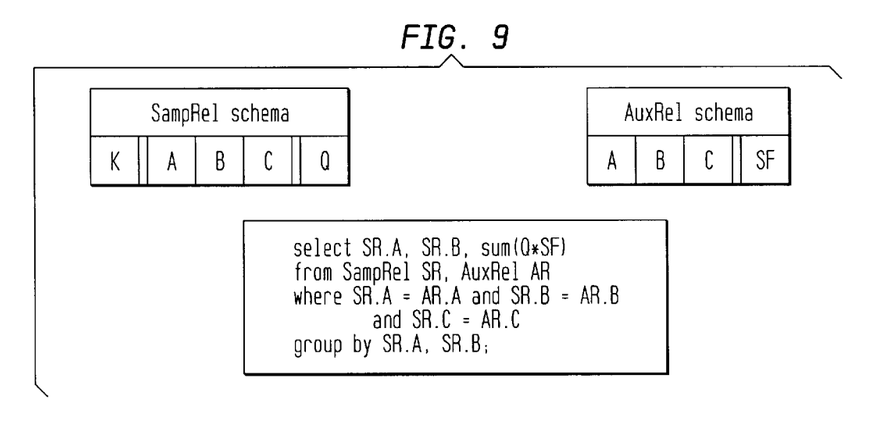
FIG. 9 is a normalized rewriting of the query in FIG. 7 in accordance with the present invention.
Figure 10:
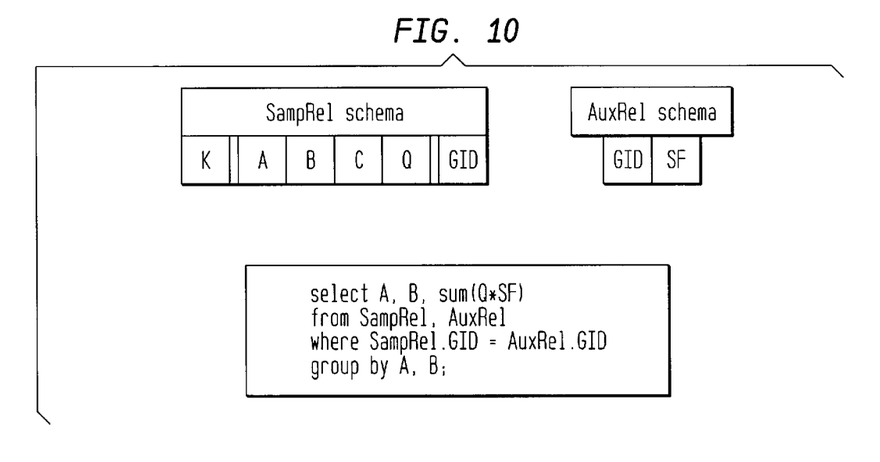
FIG. 10 is a key-normalized rewriting of the query in FIG. 7 in accordance with the present invention.

The second approach addresses the maintenance problem by normalizing the SampRel table and is demonstrated in technique Normalized shown in FIG. 9. It has only marginal maintenance overhead since the ScaleFactor information is isolated to AuxRel and, thus, updates to SampRel requires updates only to AuxRel. Since the number of groups would very likely be much fewer than the number of tuples, AuxRel would have a lower cardinality than SampRel. However, this approach has an execution time penalty due to the join required between SampRel and AuxRel. Moreover, the join condition can be non-trivial if there are many grouping attributes. The Key-normalized technique attempts to minimize this overhead. Since each group is specified explicitly by the attributes values of the grouping columns, they can be replaced by a unique group identifier (GID) as shown in FIG. 10. Note that this optimization still limits changes to the smaller AuxRel relation during updates and also reduces the space overhead of AuxRel.

Figure 11:
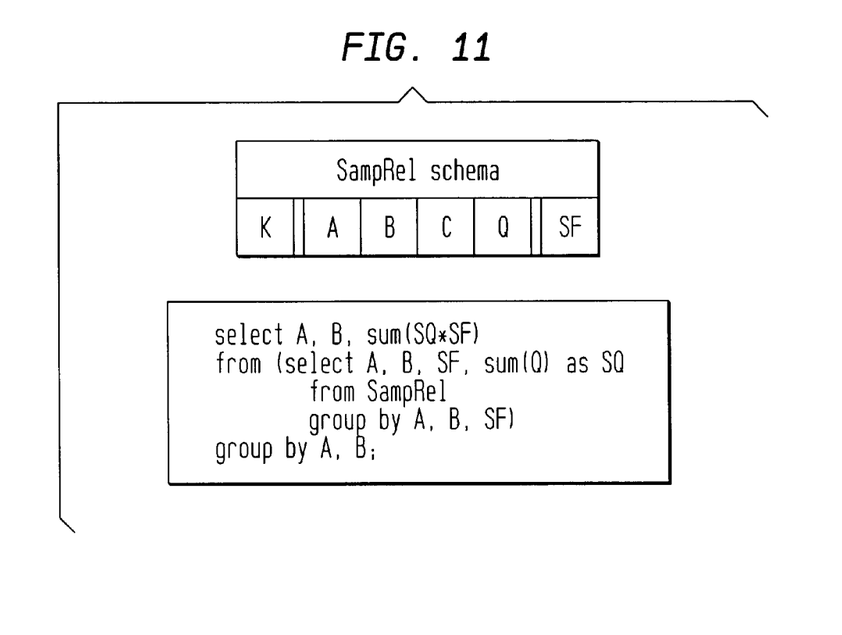
FIG. 11 is a nested-integrated rewriting of the query in FIG. 7 in accordance with the present invention.

In each of the above approaches, the ScaleFactor multiplication operation was performed for every tuple. However, since all tuples belonging to a group have the same ScaleFactor, one can optimize further to first aggregate over each group and then scale this aggregate appropriately by the ScaleFactor. This approach, however, requires a nested group-by query. While applicable to the prior techniques, this optimization is shown in FIG. 11 for Integrated rewriting and called Nested-integrated.

Figure 12:
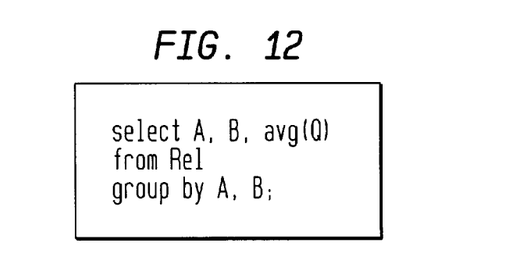
FIG. 12 is a two attribute group-by query for determining an average.
Figure 13:
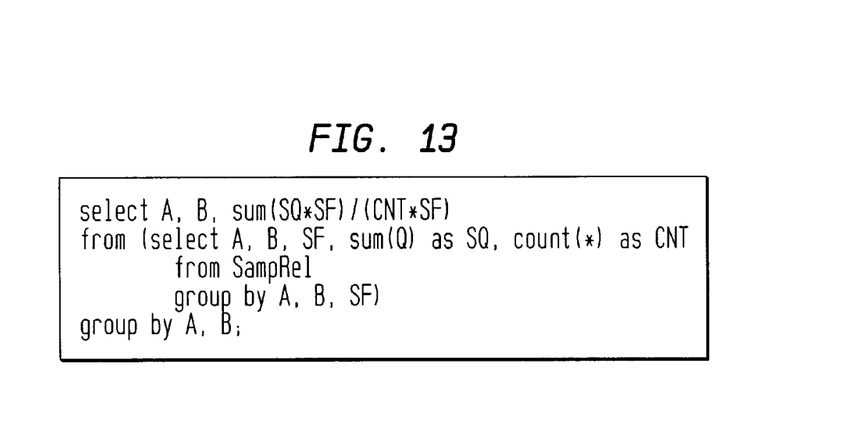
FIG. 13 is a nested-integrated rewriting of the query in FIG. 12 in accordance with the present invention.

These approaches are readily adapted to the COUNT and AVG operators. This is illustrated using the same example query $Q_2$. If the sum(Q) in $Q_2$ is replaced by count(*), then the only modifications to the rewritten queries with Integrated, Normalized, or Key-normalized rewriting are that sum(Q*SF) is replaced by simply sum(SF). Similarly, for Nested-integrated rewriting, sum(Q) is replaced by count (*). On the other hand, if the sum(Q) in $Q_2$ is replaced by avg(Q), as in query $Q_3$ in FIG. 12, then the only modifications to the rewritten queries with Integrated, Normalized, or Key-normalized rewriting are that sum(Q*SF) is replaced by sum(Q*SF)/sum(SF). The modifications for Nested-integrated rewriting are only slightly more involved, and the rewritten query is shown in FIG. 13.

III. Experiments

An extensive set of experiments were conducted to evaluate the various sample allocation techniques and rewriting strategies. The sampling allocation schemes studied were House, Senate, Basic Congress, and Congress. The rewriting strategies studied were Integrated, Nested-integrated, Normalized, and Key-normalized. A representative subset of the results generated is now presented. They were chosen to show the tradeoffs among these schemes. First, the experimental testbed is described. Then experiments to measure the accuracy for the various sample allocation scheme are shown. Finally, the performance of the various rewriting strategies are studied.

Testbed: The experiments were run on AQUA, with Oracle (v.7) as the back-end DBMS. AQUA was enhanced to use the proposed allocation schemes to compute its samples and also, the different rewriting strategies.

Database and Queries: In the experiments, the database and queries supplied with the TPC BENCHMARK™ D (TPC-D) were used. The TPC-D benchmark models a realistic business data warehouse, with sales data from the past six years. It contains a large central fact table called lineitem and several much smaller dimension tables. It is sufficient to consider queries on a single relation to evaluate the proposed techniques in AQUA. Therefore, the discussion is restricted to queries on the lineitem table. The original lineitem table contains columns which are not relevant to this discussion. Table 1A depicts a modified lineitem table. Column l_id was added to use in the experiments. Grouping (dimensional) and aggregation (measured) attributes are also depicted in Table 1A. In all the experiments, the Senate technique computes the samples for the grouping on {1_returnflag, 1_minestatus, 1_shipdate}.

Next, the TPC-D data is extended to model several relevant aspects of realistic databases. Specifically, consider the groups obtained by grouping the relation on all the three grouping attributes. In the original TPC-D data, these groups were nearly identical in size. The data in the aggregate attributes was also uniformly distributed. In the experiments, desired levels of skew are introduced into the distributions of the group-sizes and the data in the aggregated columns. This was done using the Zipf distribution, which is known to accurately model several real-life distributions. By changing the z-parameter of the distribution from 0 to 1.5, group-size distributions are generated that are uniform (i.e., all sizes are same) or progressively more skewed. The skew in the aggregated column was fixed at z=0.86, a commonly used z-parameter because it results in a 90–10 distribution. Finally, the number of groups in the relation were varied from 10 to 200K. For a given number of groups, an equal number of distinct (randomly chosen) values were generated in each of the grouping columns. Since the total number of groups is the product of these counts, if the number of groups is n, the number of distinct values in each of these columns becomes $n^{1/3}$.

The different parameters used in the experiments are listed in Table 1B. The size of the sample, determined by parameter SP, is given as a percentage of the original relation. In all the experiments, unless otherwise mentioned, the parameter takes its default value listed in the table.

TABLE 1A

Lineitem Scheme

| Attribute | 1_id | 1_returnflag | 1_linestatus | 1_shipdate | 1_quantity | 1_extendedprice |
|---|---|---|---|---|---|---|
| Data Type | int (1, 2, . . . ) | int | int | date | float | float |
| Role of Attribute | Primary Key | Grouping | Grouping | Grouping | Aggregation | Aggregation |

TABLE 1B

Experiment Parameters

| Parameters | Range of Values | Default Value |
|---|---|---|
| Table Size (T) | 100K–6M tuples | 1M |
| Sample Percentage (SP) | 1%–75% (% T) | 7% |
| Num. Groups (NG) | 10–200K | 1000 |
| Group-size Skew (z) | 0–1.5 | 0.86 |

Queries: Queries with different numbers of group-by columns were used. They are listed in Table 2 (the suffixes denote the number of group-bys in the queries). The first two queries are derived from Query 3 in the TPC-D query suite. The third query is parametrized to generate queries with desired selectivities on different parts of the data. Queries $Q_{g0}$ and $Q_{g3}$ represent two ends of the spectrum. The former poses the query over the entire relation whereas the latter causes the finest partitioning on three attributes. $Q_{g2}$, with two grouping columns, is in between the two extremes. The purpose is to identify a scheme that can provide consistently good performance for all three classes and, thus, the entire range.

TABLE 2

Queries Studied

| $Q_{g2}$ | $Q_{g3}$ | $Q_{g0}$ |
|---|---|---|
| SELECT 1_returnflag, 1_linestatus, sum(1_quantity), sum(1_extendedprice) FROM lineitem GROUP BY 1_returnflag, 1_linestatus | SELECT 1_returnflag, 1_linestatus, 1_shipdate, sum(1_quantity) FROM lineitem GROUP BY 1_returnflag, 1_linestatus, 1_shipdate | SELECT sum(1_quantity) FROM lineitem WHERE (s $\leq$ 1_id $\leq$ s + c) |

For the current study, parameter s for Query $Q_{g0}$ was chosen randomly between 0 and 950K and c was fixed at 70K. 20 queries based on these parameters were generated. Hence, each query selects about 70K tuples, i.e., 7% of the table when T is 1M.

Accuracy of Sample Allocation Strategies: The accuracies of various sample allocation strategies for group-by and non-group-by queries are computed. Then, the sensitivity of the various sampling schemes to size of the sample is studied. In each case, the exact as well as approximate answers for queries $Q_{g2}$, $Q_{g3}$, and each of the queries in the set $Q_{g0}$ are computed. For $Q_{g2}$ and $Q_{g3}$, the error is defined as the average of the percentage errors for all the groups. For the query set $Q_{g0}$, the error is defined as the average of the percentage errors for all the queries. In both cases, the error for a single group is computed using Eq. 7. Let $\{g_1, \ldots, g_n\}$ be the set of all groups occurring in the exact answer to the query. Let $c_i$ and $c_i'$ be the exact and approximate aggregate values in the group $g_i$. Then, the error $\epsilon_i$ in group $g_i$ is defined to be the percentage relative error in the estimation of $c_i$, i.e., $$\epsilon_i = (|c_i - c_i'|)/c_i * 100. \quad (7)$$

The maximum errors were measured and the relative performance of all the techniques was observed to be identical to the above average error measures.

Performance for Different Query Sets: In this experiment, the sample percentage was fixed at 7% and the accuracy of various allocation strategies for the three classes of queries was studied. Since each query set aggregates over a different set of groups, intuitively, the technique that allocates equal space to those groups is expected to have the least error. Note that, when all the groups are of the same size (i.e., z=0), all the techniques result in the same allocation, which is a uniform sample of the data. Hence, the results are discussed for the case of skewed group sizes (with z=1.5) below.

Figure 14:
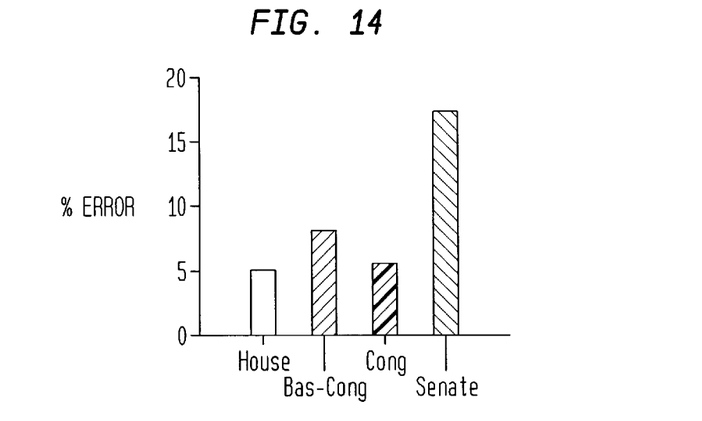
FIG. 14 is a graph depicting error percentages for different sampling techniques for a non-group-by query in accordance with the present invention.

Queries with No group-bys ($Q_{g0}$) (FIG. 14): $Q_{g0}$ consists of queries selecting uniformly over the entire data. Since Senate allocates the same space for each group, it ends up allocating less space for the large groups than the other techniques. This results in a higher overall error for Senate because a large proportion of the queries land in the large groups. The other techniques perform better because one of their considerations is allocating space uniformly over the entire data. The result is that the space allocation mirrors the queries, and all queries are answered well. The relative performance of these three techniques is determined by the weight they give to this consideration—highest in House where it is the sole consideration to the least in Basic Congress whose space allocation is skewed towards the small groups. Surprisingly, Congress's errors are low too and it is a good match for House.

Figure 15:
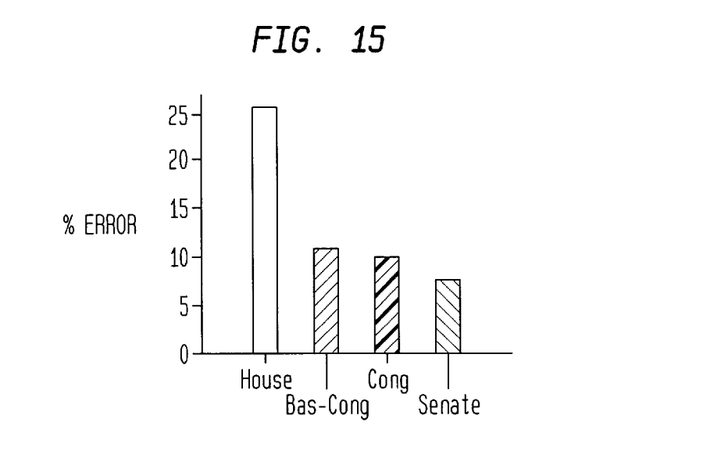
FIG. 15 is a graph depicting error percentages for different sampling techniques for a three attribute group-by query in accordance with the present invention.

Queries with Three Group-Bys ($Q_{g3}$) (FIG. 15): $Q_{g3}$ consists of aggregating over all groups at the finest granularity of grouping. This is precisely the grouping for which the Senate sampling was set up giving equal space to each of these groups. Hence, Senate has low errors for all the groups resulting in an overall good performance. On the other hand, House allocates a large part of the space to the few large groups and incurs high errors for the remaining smaller groups. Once again, Basic Congress and Congress perform in between these two ranges because they take into account small groups, but to a lesser extent than Senate.

Figure 16:
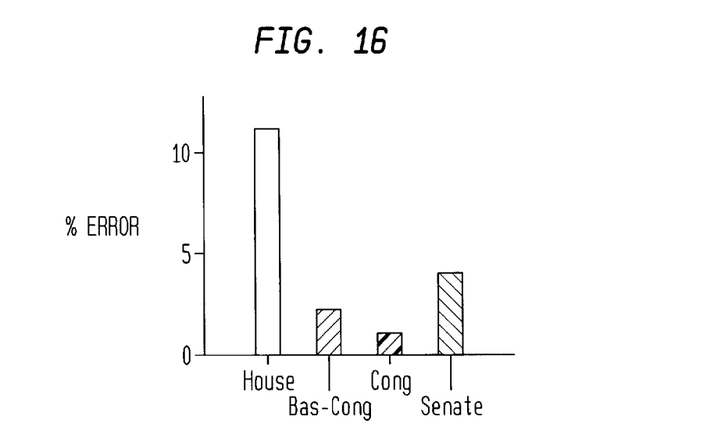
FIG. 16 is a graph depicting error percentages for different sampling techniques for a two attribute group-by query in accordance with the present invention.

Queries with Two Group-Bys ($Q_{g2}$) (FIG. 16): This is the intermediate case of grouping on two attributes. Both House and Senate perform poorly since they are designed for the two extremes. The absolute magnitude of the error in this case, however, is significantly lower than the last two sets due to the larger size of the groups—both House and Senate contain enough tuples from each group to produce reasonable estimates. The Congress technique easily outperforms them because it is tailored for this case and explicitly considers this grouping in its allocation. Thus, its allocation is close to the ideal for this query set.

It is clear from the above experiments that Congress performs consistently at the top for queries of all types. The other techniques perform well in a limited part of the spectrum, and thus, are not suitable in practice where a whole range of groupings may be of interest to the user. The Congress technique performs well because it is not optimized for a particular grouping set but instead takes into consideration all possible groupings (including no-groupings at all) in its space allocation. Thus, even in cases where it is not the best, it is extremely competitive.

Figure 17:
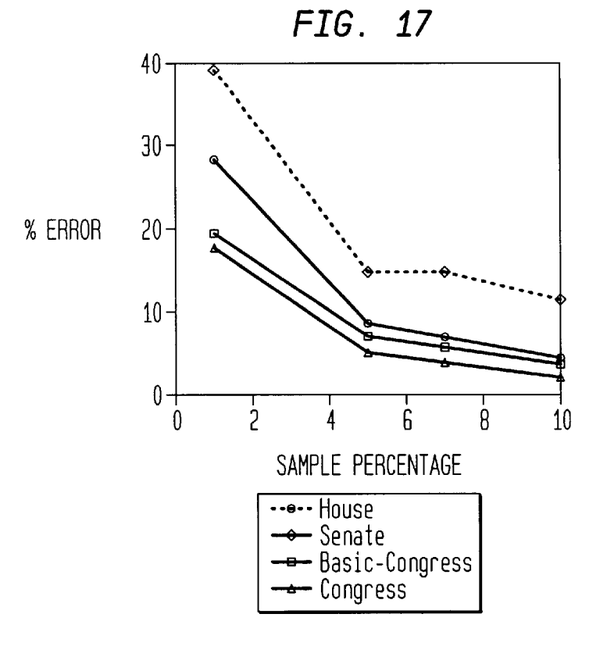
FIG. 17 is a chart depicting sample size versus accuracy for a two attribute group-by query for different sampling techniques in accordance with the present invention.

Effect of Sample Size: In this experiment a sensitivity analysis test was performed by fixing the group-size skew at 0.86 and measuring the errors incurred in answering Query $q_{g2}$ by various allocation schemes for different sample sizes. The results are plotted in FIG. 17. As expected, the errors drop as more space is allocated to store the samples. The errors for House flatten because it simply allocates more of the available space to the larger groups, which does little to improve the performance for the remaining groups. Overall, the behavior of Congress is very encouraging because its errors drop rapidly with increasing sample space. Consequently, it is able to provide high accuracies even for arbitrary group-by queries.

Performance of Rewriting Strategies: In the experiments, the actual time taken by each of the four rewriting strategies was measured. The time in seconds for running $Q_{g2}$ and writing the result into another relation are presented. The experiments were run on a Sun Sparc-20 with 256MB of memory, and 10 GB of disk space running Solaris 2.5. The effects of sample size and the number of groups are focused on because they almost entirely determine the performance of the rewrite strategies. To mitigate the effects of startup and caching, the queries were run five times and the average execution times of the last four runs were reported.

Effect of Sample Size on Rewrite Performance: In this experiment, the number of groups were fixed at 1000 and the sample percentage was varied. Table 3 shows the times taken by various strategies for different sample percentages. Running the same query on the original table data took 40 seconds on average. The table makes two points: a) the Integrated-based techniques outperform the Normalized-based techniques and b) the rise in execution times are dramatic for the Normalized-based techniques with increasing sample sizes.

Normalized and Key-normalized perform poorly due to the join between the sample table and auxiliary table. Among them, the slightly better performance of Key-normalized is due to a shorter join predicate involving just one attribute (l_id), as against two (l_returnflag and l_linestatus) for Normalized. Among Integrated and Nested-integrated, the latter performed consistently better in spite of being a nested query. The fewer multiplications with the scalefactor performed by Nested-integrated (one per group) pays off over Integrated which does one multiplication per tuple. This tradeoff is explored in the next experiment. Overall, solely from the performance viewpoint, these two techniques are still significantly faster than the normalized ones.

TABLE 3

Times Taken for Different Sample Percentages
(actual query time = 40 seconds)

| Technique | 1% | 5% | 10% |
|---|---|---|---|
| Integrated | 1.3 | 3.8 | 6.8 |
| Nested-integrated | 1.2 | 3.3 | 6.0 |
| Normalized | 1.7 | 14.0 | 27.3 |
| Key-normalized | 1.8 | 14.3 | 28.4 |

Figure 18:
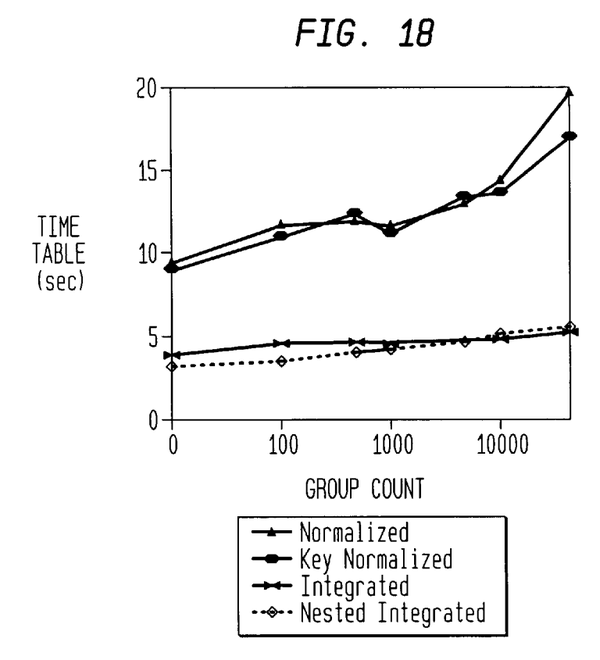
FIG. 18 is a chart depicting query time versus the number of groups for different sampling techniques in accordance with the present invention.

Effect of Group Count: In this experiment, the sample percentage was fixed at 7% and the number of groups in the relation were varied. The times taken by the various rewriting strategies are plotted in FIG. 18. Running the query on the original data for this case took between 35–40 seconds. It is clear that the Integrated and Nested-integrated are once again noticeably faster than the other two techniques, primarily because of the absence of a join operation. In fact, their times are almost independent of the number of groups, which makes them suitable candidates for all types of queries.

For small values of group count, Nested-integrated does better than Integrated due to significantly fewer multiplications. Since Nested-integrated does one multiplication per group, as the number of groups increase, its overhead increases. In combination with the extra overhead of a nested query, eventually Nested-integrated's performance degrades below Integrated on the right end of the graph.

Summary of Rewriting Strategies: The above experiments clearly show that Integrated and Nested-integrated have consistent performance over a wide spectrum of sample sizes and group counts and easily outperform the other two techniques. However, they incur higher maintenance costs. Hence, the choice of a technique depends on the update frequency of the warehouse environment. If the update frequencies are moderate to rare, Integrated (or Nested-integrated) should be the technique(s) of choice. Only the (rare) high frequency update case warrants for the higher execution times incurred by Key-normalized—note that as the warehouse grows larger relative to the sample, the probability of an update reflecting immediately in the sample shrinks significantly, making this an unlikely case in practice.

IV. Extensions

Generalization to Multiple Criteria: Techniques that attempt to allocate the maximum possible number of samples to each group have been presented. However, the error in an answer depends on other factors as well, such as the variance of the data within a group. For example, consider two groups of the same size. The first has values that are reasonably uniform while the other has values with a very high variance. The House and Senate approach would assign the same space to both these groups. However, the first group may not need the allocated space since the values are uniformly distributed and a smaller sample might suffice for a reasonable estimate. Similarly, the second group may benefit from more tuples to account for the wide distribution of values within the group. Thus, the use of the variance of values within the group can be expected to further improve the sample accuracy. In addition to variance of the values, there may be other factors affecting the quality of an answer, e.g., the difference between the maximum and minimum values within a group, the variance of some commonly-used expression applied to the values (e.g., price * (1−discount) *(1+tax)), etc.

Figure 19:
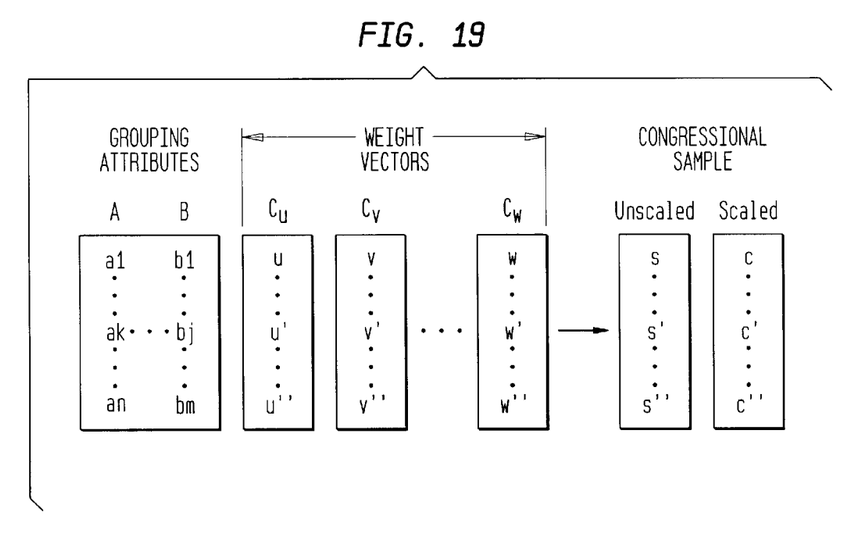
FIG. 19 is a block diagram depicting the congressional samples framework in accordance with the present invention.

One of the key features of congressional samples is its extensibility to different space allocation criteria such as those proposed above. FIG. 19 shows a typical structure of the table that is used to determine space allocation in a congressional sample similar to that in FIG. 1. Note that there are three classes on columns. The ones on the left are the attribute columns which contain the possible groups in some order. The columns in the middle, referred to as weight vectors, contain for some criteria, the relative ratios of space, or weights, to be allocated to each of the groups (e.g., in proportion to the variances of the groups). For example, in FIG. 1, House and Senate strategies contributed a weight vector each. The last two columns aggregate the space allocated by each of the weight vectors to generate the final number of tuples assigned for each group.

In this framework, it is straightforward to account for a new allocation criteria. For example, to add the Group variance criteria in FIG. 1, the weight vector for it is derived. Having done so, generating the space allocation for the congressional sample follows as before (by choosing the maximum from each column and scaling down). In fact, one can consider adding as many weight vectors as required by the application. The power of this framework is in allowing varied and potentially conflicting group-by queries to have a fair chance to vie for the total available space.

Generalization to Other Queries: The Congressional Samples framework can be extended beyond group-by queries. A group-by query simply partitions the attribute space based on specific attribute values. However, one may also consider other partitions of the space such as ranges of values, where the user has a biased interest in some of the partitions. For example, if a sample of the sales data were used to analyze the impact of a recent sales promotion, the sample would be more effective if the most recent sales data were better represented in the sample as opposed to older data. This can be easily achieved in the above framework by replacing the values in the grouping columns by distinct ranges (in this case on dates) and deriving the weight vectors that weigh the ranges as desired with respect to each other.

V. Conclusion

The growing popularity of on-line analytical processing (OLAP) and data warehousing has highlighted the need for approximate query answering systems. These systems offer high performance by answering queries from compact summary statistics, typically uniform random samples, of the data. It is critical in such systems to provide reasonably accurate answers to commonly posed queries.

Precomputed uniform random samples are not sufficient to accurately answer group-by queries, which form the basis of most of the data analysis in decision support systems. To be effective for group-by queries, the data should be sampled non-uniformly, using biased sampling. The present invention generates biased samples termed congressional samples. The congressional samples are then queried. In a preferred embodiment, congressional samples are constructed in one pass over the relation. In addition, the congressional samples are incrementally maintained in the presence of database insertions, without accessing the stored relation.

All of the techniques presented are capable of being incorporated into an Approximate Query Answering system, called AQUA. By providing the ability to answer group-by queries, the new techniques have significantly enhanced the overall accuracy and usability of AQUA as a viable decision support system. The present invention is applicable beyond AQUA, and even beyond group-by queries, and can be used wherever the limitations of uniform random samples become critical.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for deriving a database sample comprising the steps of selecting grouping attributes within a relational database having tuples;

grouping said tuples based on said grouping attributes to derive sub groups;

applying a function to determine a number of tuples for each of said sub groups; and selecting a database sample comprising tuples according to said number of tuples for each of said sub groups from a corresponding sub group.

2. The method of claim 1, wherein said step of selecting grouping attributes comprises:

selecting a plurality of grouping attributes within said relational database.

3. The method of claim 1, wherein said grouping step comprises:

grouping said tuples on one or more subsets of said grouping attributes including no groupings to derive said sub groups.

4. The method of claim 1, wherein said grouping step comprises:

grouping said tuples on every subset of said grouping attributes including no groupings to derive said sub groups.

5. The method of claim 4, wherein said function in said applying step comprises:

$$X \frac{\max_{T \subseteq G} s_{g,T}}{\sum_{j \in G'} \max_{T \subseteq G} s_{j,T}};$$

where $$s_{g,T} = \frac{X}{m_T} \cdot \frac{n_g}{n_h};$$

and where X is a total sample size, G represents said grouping attributes, T represents one of said subsets within said grouping attributes G, $m_T$ is a number of non-empty groups under a corresponding one of said subsets T, G' represents all non-empty groups under said grouping attributes G, $n_g$ is a number of tuples in a corresponding one of said sub groups g in G' of a group h under the grouping T, and $n_h$ is a number of all tuples in the group h.

6. The method of claim 1, wherein said grouping step comprises:

grouping said tuples based on a single set of attributes and on no attribute groupings.

7. The method of claim 6, wherein said function in said applying step comprises:

$$X \frac{\max\left(\frac{n_g}{|R|}, \frac{1}{m_T}\right)}{\sum_{j \in G'} \max\left(\frac{n_j}{|R|}, \frac{1}{m_T}\right)}$$

where X is a total sample size, T is said single set of attributes, $m_T$ is a number of non-empty groups under T, G' represents all non-empty groups under said grouping T, g is one of said sub groups, $n_g$ is a number of tuples in a corresponding one of said sub groups g, and R is a number of all tuples in said relational database.

8. The method of claim 1, wherein said grouping, applying, and selecting said database sample steps are performed in a single pass over said relational database.

9. The method of claim 8, wherein said grouping, applying, and selecting said database sample steps are performed without a priori knowledge of a data distribution within said relational database.

10. The method of claim 8, wherein said grouping, applying, and selecting said database sample steps are performed without a priori knowledge of a database query to be performed on said database sample.

11. The method of claim 1, further comprising the step of:

maintaining said database sample to reflect changes in said relational database.

12. The method of claim 11, wherein said maintaining step comprises modifying said database sample in response to a new tuple in said relational database.

13. The method of claim 12, wherein said selecting said database sample step and maintaining step comprise using reservoir sampling techniques.

14. The method of claim 1, wherein said selecting said database sample step comprises:

selecting a uniform random sample for each of said sub groups from a corresponding sub group according to said number of tuples for each of said sub groups.

15. The method of claim 1, wherein said applying step comprises:

applying said function to determine said number of tuples for each of said sub groups, said function weighting said grouping attributes.

16. The method of claim 1, further comprising the step of:

storing said database sample.

17. The method of claim 1, wherein one of said selected grouping attributes is time;

said grouping step comprises grouping said tuples based on intervals of time to derive sub groups; and said applying step comprises applying said function to determine a number of tuples for each of said sub groups such that tuples associated with more recent time intervals are sampled at a higher rate.

18. A method for querying a database comprising the steps of:

selecting grouping attributes within a relational database having tuples;

grouping said tuples based on said grouping attributes to derive sub groups;

applying a function to determine a number of tuples for each of said sub groups;

selecting a database sample of tuples according to said number of tuples for each of said sub groups from a corresponding sub group; and querying said database sample.

19. The method of claim 18, wherein said selecting grouping attributes step comprises:

selecting a plurality of grouping attributes within said relational database having tuples.

20. The method of claim 18, further comprising the step of storing a scaling factor for each of said sub groups.

21. The method of claim 20, further comprising the step of extrapolating results from said querying step utilizing said scaling factor for each of said sub groups.

22. The method of claim 21, wherein said scaling factor for each of said sub groups is stored with each tuple within a corresponding sub group.

23. The method of claim 21, wherein said scaling factor for each of said sub groups is stored in a scaling table.

24. The method of claim 18, wherein said grouping step comprises:

grouping said tuples on every subset of the grouping attributes including no groupings to derive sub groups.

25. The method of claim 18, wherein said grouping step comprises:

grouping said tuples based on a single set of attributes and on no attribute groupings.

26. The method of claim 18, further comprising the step of:

storing said database sample.

27. The method of claim 26, wherein said querying step comprises:

performing a plurality of queries with a plurality of groupings on said stored database sample.

28. The method of claim 18, wherein said applying step comprises:

applying said function to determine said number of tuples for each of said sub groups, said function weighting said grouping attributes.

29. The method of claim 18, further comprising the step of:

rewriting a query intended for said relational database for use with said relational database sample.

30. The method of claim 29, wherein said rewriting step comprises:

rewriting said query for use with an approximate querying system.

31. The method of claim 18, wherein said selecting said database sample step comprises: selecting a uniform random sample for each of said sub groups from a corresponding sub group according to said number of tuples for each of said sub groups.

32. The method of claim 18, wherein one of said selected grouping attributes is time;

said grouping step comprises grouping said tuples based on intervals of time to derive sub groups; and said applying step comprises applying said function to determine a number of tuples for each of said sub groups such that tuples associated with more recent time intervals are sampled at a higher rate.

33. A method for deriving a relational database sample comprising the steps of:

selecting a uniform sample from a database having tuples;

selecting grouping attributes within said database;

grouping said tuples based on said grouping attributes to derive sub groups;

applying a function to determine a number of tuples for each of said sub groups; and adding additional tuples to said uniform sample in accordance with said function, wherein said additional tuples for each of said sub groups are obtained from a corresponding sub group within said database.

34. The method of claim 33, wherein additional tuples are added when said number of tuples for a first one of said sub groups exceed a number of tuples selected from said first one of said sub groups for said uniform sample.

35. A system for deriving a database sample comprising:

a relational database having tuples and grouping attributes;

grouping means for grouping said tuples based on said grouping attributes to derive sub groups;

means for determining a number of tuples for each of said sub groups; and a selector for selecting a database sample comprising tuples according to said number of tuples for each of said sub groups from a corresponding sub group.

36. The system of claim 35, further comprising:

a table for storing said database sample.

37. A system for querying a database comprising:

a relational database having tuples and grouping attributes;

grouping means for grouping said tuples based on said grouping attributes to derive sub groups;

means for determining a number of tuples for each of said sub groups;

a selector for selecting a database sample of tuples according to said number of tuples for each of said sub groups from a corresponding sub group; and a querying system for querying said database sample.

38. The system of claim 37, further comprising;

a table for storing said database sample.

* * * * *